A. F. BATCHELDER.
ELECTRIC LOCOMOTIVE OR CAR.
APPLICATION FILED MAR. 21, 1918.

1,310,049.

Patented July 15, 1919.

Inventor:
Asa F. Batchelder,
by Albert G. Davis
His Attorney.

UNITED STATES PATENT OFFICE.

ASA F. BATCHELDER, OF SCHENECTADY, NEW YORK, ASSIGNOR TO GENERAL ELECTRIC COMPANY, A CORPORATION OF NEW YORK.

ELECTRIC LOCOMOTIVE OR CAR.

1,310,049.  Specification of Letters Patent.  Patented July 15, 1919.

Application filed March 21, 1918. Serial No. 223,723.

*To all whom it may concern:*

Be it known that I, ASA F. BATCHELDER, a citizen of the United States, residing at Schenectady, in the county of Schenectady, State of New York, have invented certain new and useful Improvements in Electric Locomotives or Cars, of which the following is a specification.

My invention relates to electric locomotives or cars, and particularly to such locomotives or cars in which the frame or body of the truck constitutes the field magnet structure of the motors, the pole pieces and other members of the field magnet structure being so arranged that the magnetic circuit for all the motors extends through the pole pieces and thence through the truck frame, thus providing a magnetic circuit common to all the armatures. As such locomotives have been constructed heretofore, the truck frame has been a continuous integral structure extending throughout the length of the locomotive, making a locomotive with a very long rigid wheel-base. As is well known, a locomotive with a very long rigid wheel-base will not operate on track with short radius curves.

In accordance with my invention, I provide an electric locomotive or car with a plurality of trucks, each constructed so as to provide a magnetic circuit common to all the motor armatures thereon, the trucks being connected together by a joint which permits relative movement between the trucks and, at the same time, conveys magnetic flux from one truck to another. This joint has low magnetic reluctance and comprises coöperating overlapping members. With such an arrangement I obtain the advantages of a locomotive having a common magnetic circuit for all the motor armatures, and at the same time do not have the disadvantages of a long rigid wheel-base.

Figure 1:
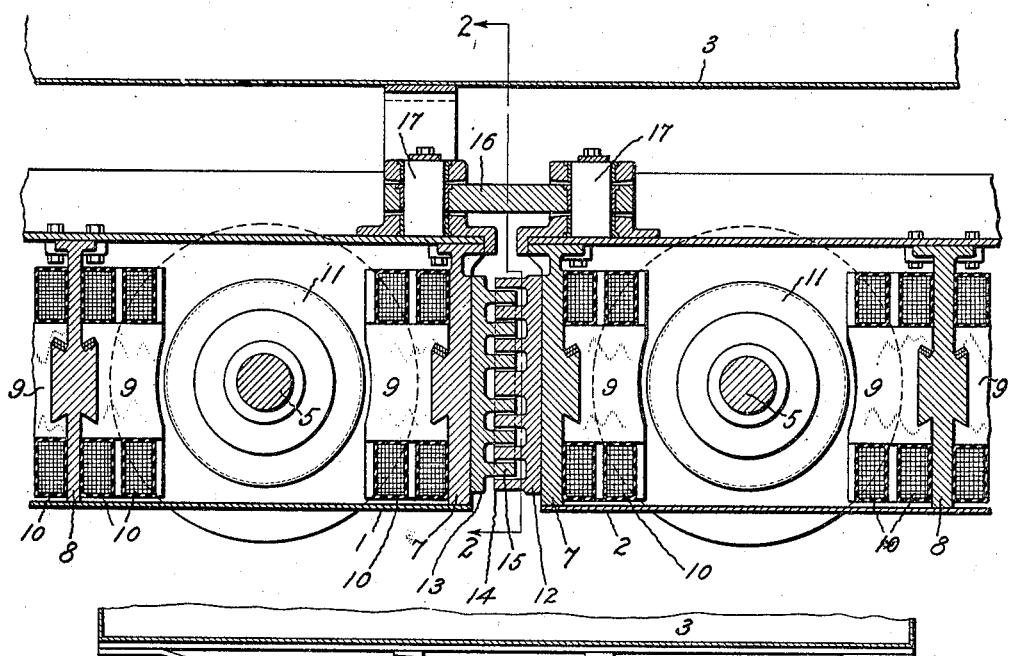
Figure 2:
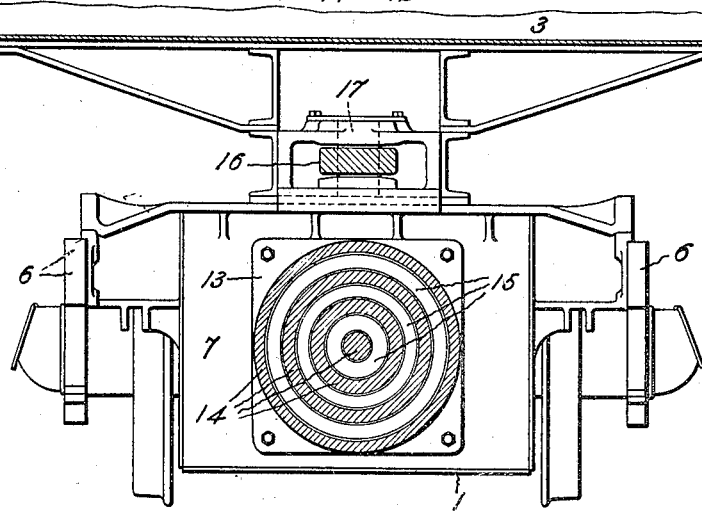

The various features of novelty which characterize my invention are pointed out with particularity in the claims annexed to and forming a part of this specification. For a better understanding of my invention, reference may be had to the following description taken in connection with the accompanying drawing, in which Figure 1 is a sectional view of a portion of an electric locomotive embodying my invention, and Fig. 2 is a sectional view taken on the line 2—2 of Fig. 1.

In the drawing I have illustrated a portion of the electric locomotive forming the subject matter of my application, Serial No. 223,724 filed March 21, 1918. This locomotive comprises two similar running gear sections, each of which has mounted thereon two trucks, 1 and 2. The car frame 3 is rigidly connected to truck 1 and supported on truck 2 at a point above the truck frame, such support allowing a relative transverse or angular movement between the car frame and the truck 2. The truck frames of each of the trucks 1 and 2 is suitably supported upon a plurality of wheeled axles 5. The truck frames comprise longitudinal magnetic members 6 which are connected together by magnetic end members 7 and intermediate members 8. These intermediate members are located between the axles 5. The pole pieces 9 are located on opposite sides of each of these intermediate transverse members and on the inner sides of the end members 7, and are secured thereto in any suitable manner. They are provided with field coils 10. Motor armatures 11 are located directly upon the axles 5 and in operative relation to the pole pieces 9.

The truck frames are joined together so as to allow relative movement between the trucks by means of members 12 and 13. The member 12 has projecting portions 14 separated by indentations and the member 13 has projecting portions 15 fitting into the indentations on the member 12. The projecting portions 14 and 15 overlap one another and convey magnetic flux from one truck to another. The members 12 and 13 are free from each other mechanically and the projecting portions 14 and 15 are preferably in the form of concentric rings, as clearly shown in Fig. 2. In order to take the draft strains between the trucks, I provide a link 16 which is mounted on pins 17 on top of the truck frames. These links take the draft strains, both pushing and pulling, and since they are mounted on top of the truck frames, they are substantially in direct line with the couplers. By making the projecting members 14 and 15 deep so that their surfaces overlap considerably, it is possible to have a large surface of contact with a low flux density so that the joint will be of low magnetic reluctance. The members 14 and 15 are made with sufficient clearance between them to allow the trucks to go around curves. By making these projections in the form of concentric rings, the joint is in the form of a universal joint, making it possible for one truck to twist with relation to the other.

As shown in the figures of the drawing, the members 12 and 13 are bolted to the end member 7 although they may, if desired, be made integral therewith. With such a construction, my joint not only acts as a guiding joint but can also carry part of the load carried by truck 2. If desired for any reason either or both of the members 12 and 13 may be mounted on the end members 7 for vertical movement in reference thereto. If constructed in this way, the joint will not carry any load.

As explained above, the magnetic flux may pass through all of the motor armatures 6 and field poles 7 on all of the trucks of the locomotive in series, and may return partly through the longitudinal members 6 of the truck frame and partly through the cab structure.

I desire it to be understood that my invention is not limited to the particular arrangement shown and described, and I aim in the appended claims to cover all modifications thereof which do not depart from the spirit and scope of my invention.

What I claim as new and desire to secure by Letters Patent of the United States, is,—

1. In an electric locomotive or car, a plurality of trucks, each of said trucks comprising a truck frame, pole pieces for an armature, and a motor armature operatively located with reference to said pole pieces, and a joint of low magnetic reluctance between said trucks for permitting relative movement therebetween and for conveying magnetic flux from one truck to another, said joint comprising members having projections and indentations, the projections on one of said members fitting into the indentations on the other member.

2. In an electric locomotive or car, a plurality of trucks, each of said trucks comprising a truck frame, pole pieces for an armature, and a motor armature operatively located with reference to said pole pieces, a joint between said trucks for permitting relative movement therebetween and for conveying magnetic flux from one truck to another, said joint comprising members having projections and indentations, the projections on one of said members fitting into the indentations on the other of said members, and a link connecting said truck frames for taking the draft strains between said trucks.

3. In an electric locomotive or car, a plurality of trucks, each of said trucks comprising a truck frame, pole pieces for an armature, and a motor armature operatively located with reference to said pole pieces, and a joint between said trucks for permitting relative movement therebetween and for conveying magnetic flux from one truck to another, said joint comprising members having projections and indentations, the projections on one of said members fitting into the indentations on the other of said members, said members being mechanically free from one another.

4. In an electric locomotive or car, a plurality of trucks, each of said trucks comprising a truck frame, pole pieces for an armature, and a motor armature operatively located with reference to said pole pieces, a joint between said trucks for permitting relative movement therebetween and for conveying magnetic flux from one truck to another, said joint comprising coöperating overlapping members, and a link connecting said truck frames for taking the draft strain between said trucks.

5. In an electric locomotive or car, a plurality of trucks, each of said trucks comprising a truck frame, pole pieces for an armature, and a motor armature operatively located with reference to said pole pieces, a joint between said trucks for permitting relative movement therebetween and for conveying magnetic flux from one truck to another, said joint comprising coöperating overlapping members, said members being mechanically free from one another, and a link connecting said truck frames for taking the draft strain between said trucks.

6. In an electric locomotive or car, a plurality of trucks, each of said trucks comprising a truck frame, pole pieces for an armature, and a motor armature operatively located with reference to said pole pieces, a joint between said trucks for permitting relative movement therebetween and for conveying magnetic flux from one truck to another, said joint comprising coöperating overlapping members, such members being mechanically free from one another, and a link connecting said truck frames for taking the draft strains between said trucks.

7. In an electric locomotive or car, a plurality of trucks, each of said trucks comprising a truck frame, pole pieces for an armature, and a motor armature operatively located with reference to said pole pieces, a joint between said trucks for permitting relative movement therebetween and for conveying magnetic flux from one truck to another, said joint comprising coöperating overlapping members, said members being mechanically free from one another, and a link mounted on top of said truck frames for taking the draft strains between said trucks.

8. In an electric locomotive or car, a plurality of trucks, each of said trucks comprising a truck frame, pole pieces for an armature, and a motor armature operatively located with reference to said pole pieces, and a joint between said trucks for permitting relative movement therebetween and for conveying magnetic flux from one truck to another, said joint comprising coöperating members, each of said members comprising concentric rings, the rings of one member overlapping the rings on the other member.

9. In an electric locomotive or car, a plurality of trucks, each of said trucks comprising a truck frame, pole pieces for an armature, and a motor armature operatively located with reference to said pole pieces, and a joint between said trucks, for permitting relative movement therebetween and for conveying magnetic flux from one truck to another, said joint comprising coöperating members, each of said members comprising concentric rings, the rings of one member overlapping the rings of the other, said rings being mechanically free from one another.

10. In an electric locomotive or car, a plurality of trucks, each of said trucks comprising a truck frame, pole pieces for an armature, and a motor armature operatively located with reference to said pole pieces, a joint between said trucks for permitting relative movement therebetween and for conveying magnetic flux from one truck to another, said joint comprising coöperating members, each of said members comprising concentric rings, the rings of one member overlapping the rings on the other member, said rings being mechanically free from one another, and a link connecting said truck frames for taking the draft strains between said trucks.

11. In an electric locomotive or car, a plurality of trucks, each of said trucks comprising a truck frame, pole pieces for an armature, and a motor armature operatively located with reference to said pole pieces, a joint between said trucks for permitting relative movement therebetween and for conveying magnetic flux from one truck to another, said joint comprising coöperating members, each of said members comprising concentric rings, the rings of one member overlapping the rings of the other member, said rings being mechanically free from one another, and a link mounted on top of said truck frames for taking the draft strains from said trucks.

In witness whereof, I have hereunto set my hand this 19th day of March, 1918.

ASA F. BATCHELDER.

Copies of this patent may be obtained for five cents each, by addressing the "Commissioner of Patents, Washington, D. C."